United States Patent [19]

Kunnecke et al.

[11] Patent Number: 4,703,150
[45] Date of Patent: Oct. 27, 1987

[54] WELDABLE CONNECTING MEMBER FOR CONNECTING OR JOINING THERMOPLASTIC PIPE ELEMENTS

[75] Inventors: Walter Kunnecke, Binningen; Urs Amacher, Aeschi; Max Meier, Luterkofen, all of Switzerland

[73] Assignee: Von Roll AG, Gerlafingen, Switzerland

[21] Appl. No.: 769,851

[22] Filed: Aug. 26, 1985

[30] Foreign Application Priority Data

Aug. 28, 1984 [CH] Switzerland ............. 4126/84

[51] Int. Cl.$^4$ ............................ H05B 3/58
[52] U.S. Cl. ..................... 219/535; 219/544
[58] Field of Search .............. 219/494, 449, 535, 544, 219/506; 340/612, 618–624; 285/417; 156/78, 380.2

[56] References Cited

U.S. PATENT DOCUMENTS

| | | | |
|---|---|---|---|
| 2,684,414 | 7/1954 | Kilpatrick | 340/623 X |
| 3,943,334 | 3/1976 | Sturm | 219/544 |
| 4,117,311 | 9/1978 | Sturm | 219/544 |
| 4,493,985 | 1/1985 | Keller | 219/535 |

FOREIGN PATENT DOCUMENTS 632078 9/1982 Switzerland .

Primary Examiner—E. A. Goldberg
Assistant Examiner—C. M. Sigda
Attorney, Agent, or Firm—Bachman & LaPointe

[57] ABSTRACT

The connecting member has a sleeve body and a resistance heating wire embedded therein with terminals to a power supply. By heating the resistance heating wire, a welding area between the sleeve member is plasticized and welded. For checking the weld quantity, an indicator is provided, which comprises a cavity having a piston with an indicator pin movable therein in the welding area. During welding the material which becomes plastic as a result of the welding pressure is forced into the cavity, so that the indicator pin covered prior to welding is forced out through a passage and is consequently visible and tangible. As the travel of the piston is limited by a cover at the end of the cavity and the distance from the bottom of the cavity to the welding area can be selected corresponding to the desired welding pressure, the end position of the exiting indicator pin corresponds to a temperature and pressure range necessary for completely satisfactory welding.

15 Claims, 13 Drawing Figures

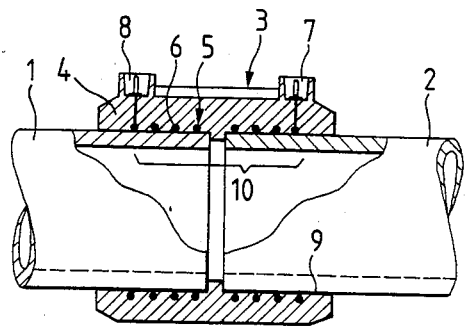
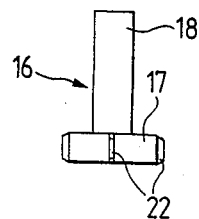
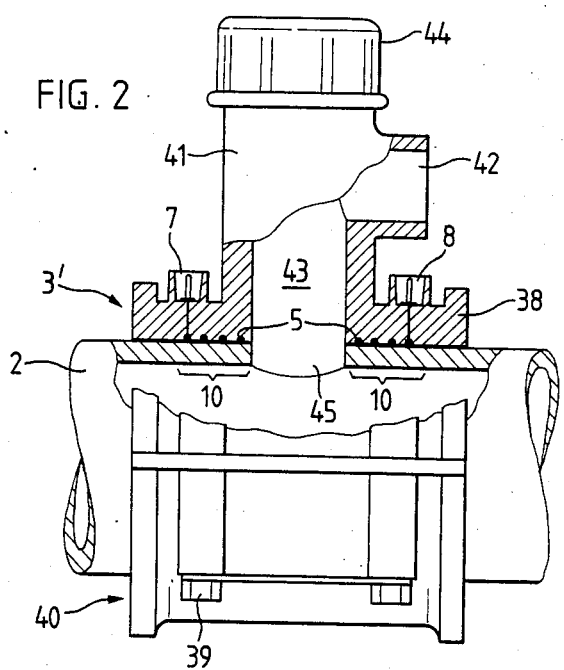
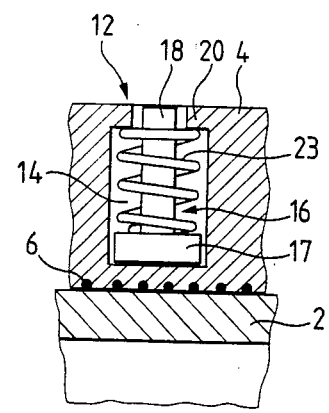
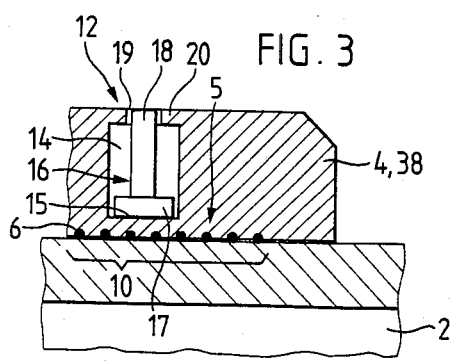
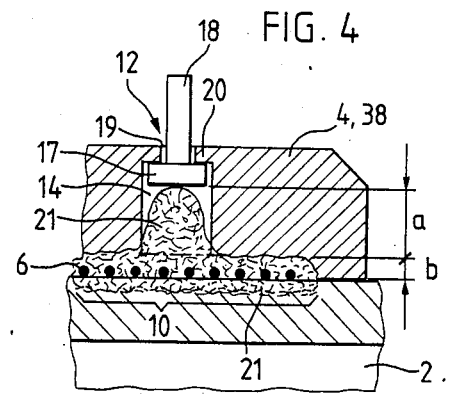

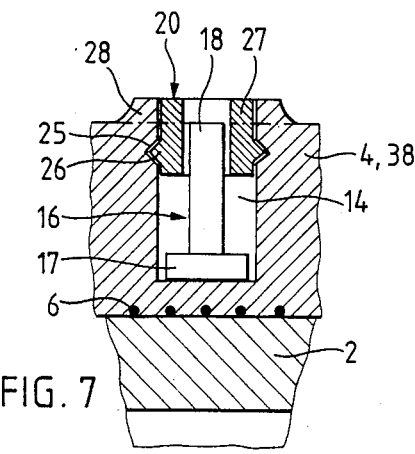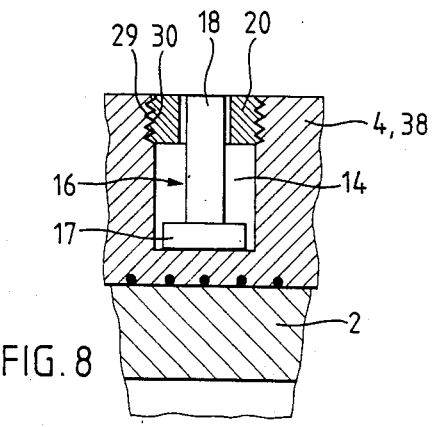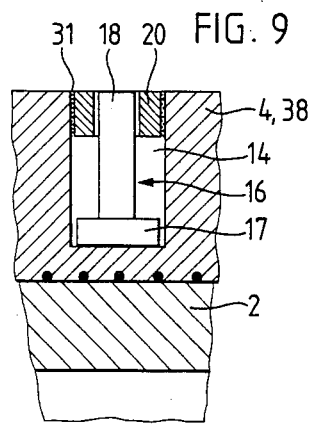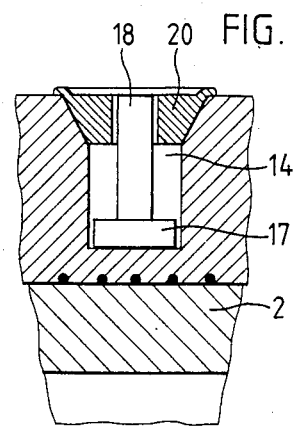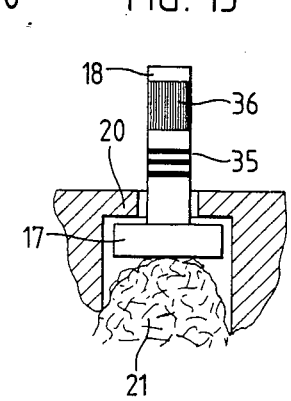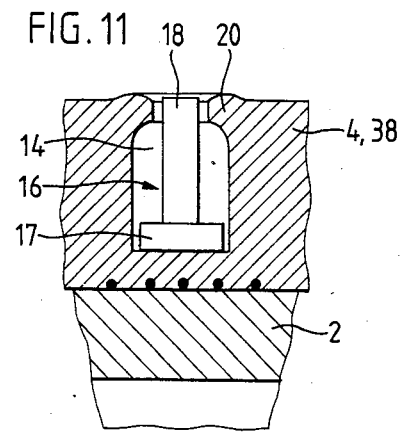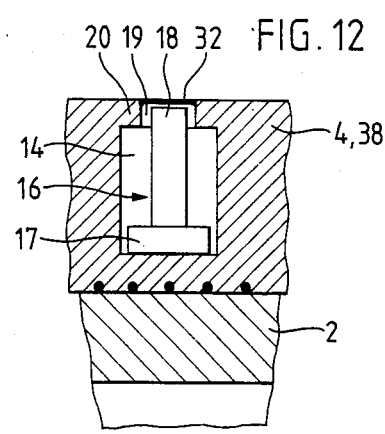

WELDABLE CONNECTING MEMBER FOR CONNECTING OR JOINING THERMOPLASTIC PIPE ELEMENTS

BACKGROUND OF THE INVENTION

The present invention relates to a weldable connecting member for connecting or joining thermoplastic pipe elements, which has a thermoplastic body, in which a heating element is embedded for generating heat and which is used for welding the body to the pipe element or elements located in the welding area.

The joining of thermoplastic pipe elements with the aid of a thermoplastic connecting member provided with a heating element is generally known. The term pipe elements is understood to mean pipelines, fittings and shaped parts, which are joined together by the connecting members to form pipe systems and the like. The connecting members are frequently constructed as electric welded sleeves and as electric weldable spot drilling and connecting clips. However, the connecting members can also be used for connecting elements other than pipe elements, that is, for joining together rods. However, the use of weldable connecting members in building pipelines is one of the most frequent applications.

In order that the joining of the pipe elements by means of such connecting members takes place reliably, it is necessary to check the welding operation. The quality of the weld is essentially dependent on the correct temperature in the welding area and the welding pressure occurring during the welding process, that is, the pressure on the material in the welding zone which has been plasticized by the heat supplied. This results from the fact that the connecting member is given a shrinkage reserve which, during the plasticizing of the welding area by the heat supplied, leads to a shrinkage of the connecting member. This shrinkage, linked with the volume increase of the material on heating the welding area, leads to said pressure rise in the latter.

As all circumstances preventing the reaching of the correct welding temperature and pressure result in a quality reduction of the welded joint, over a long period now the joining members have been provided with additional indicating means enabling conclusions to be drawn on the weld quality.

In one known indicator a color change point is used, which is applied to the outside of the sleeve surface and in the case of adequate heating of the connecting member body undergoes a color change. In order to achieve an improved temperature indication, it is known (Swiss Pat. No. 553 368), to place the color change point on a reduced wall thickness zone. However, even in this case it is only possible to determine the temperature, but not the welding pressure and there is also uncertainty regarding the possibility of a color change resulting from external thermal influences.

As the temperature indication on the connecting member does not in itself enable reliable conclusions to be drawn regarding the quality of the weld, solutions are also known in which the pressure occurring in the welding area of the weld is made visible. For this purpose, weak points in the connecting member body can be provided, which bulge as a result of the welding pressure which occurs. It is also known (Swiss Pat. No. 632 078) to provide recesses, whose bottom terminates in the vicinity of the welding area. During welding, said recesses fill with more or less plastic material and consequently indicate whether there is an adequate welding pressure with corresponding temperature in the welding area. A known improvement of this quality indication for the weld (Swiss Pat. No. 601 719) consists of placing a pin in the bore. When the welding pressure occurs, the pin rises over the sleeve surface and is consequently readily visible. This construction has proved particularly appropriate in the case of relatively thin-walled connecting members. The projecting pin constitutes a relatively accurate measure of the temperature and welding pressure in the welding area. However, in the case of higher welding pressures, as conventionally occur with thick-walled connecting members, said construction suffers from the disadvantage that it is difficult to establish the depth of the bore. If the bottom of the bore is too close to the welding area, the pin movement takes place prematurely, but if the bottom of the bore is remote from the welding, area there is no pin movement, although the welding pressure has occurred.

SUMMARY OF THE INVENTION

It is therefore the object of the present invention to provide a weldable connecting member of the aforementioned type, in which there is a clear indication of the pressure and temperature conditions in the welding area and on the basis of which it is possible to assess whether or not the weld will be good or not.

The foregoing object is achieved by way of the invention wherein in the welding area, a closed cavity is provided on the body and in same is placed an indicator, which can be moved from an initial position near the welding area during welding into an end position remote from the welding area, being provided with indicator means indicating in the end position of the piston the temperature and pressure conditions in the welding area.

BRIEF DESCRIPTION OF THE DRAWINGS

The invention is described in greater detail hereinafter relative to non-limitative embodiments and the attached drawings, wherein FIG. 1 is a longitudinal section through the junction of two pipe ends using an electric welded sleeve.

FIG. 2 is a side view, partly in section, of the junction of a pipeline with a spot drilling or connecting clip.

FIG. 3 is a detail from the joint according to FIGS. 1 or 2 with an indicator arranged in the welding area of the electric welded sleeve.

FIG. 4 is the indicator of FIG. 3 after a satisfactory weld has been produced.

FIG. 5 is a side view of a piston of the indicator with friction-producing disks arranged on the piston circumference.

FIG. 6 is another embodiment of the indicator.
FIG. 7 is a third embodiment of the indicator.
FIG. 8 is a fourth embodiment of the indicator.
FIG. 9 is a fifth embodiment of the indicator.
FIG. 10 is a sixth embodiment of the indicator.
FIG. 11 is a seventh embodiment of the indicator.
FIG. 12 is an eighth embodiment of the indicator.
FIG. 13 is a ninth embodiment of the indicator.

DETAILED DESCRIPTION OF THE PREFERRED EMBODIMENTS

For the purpose of joining the ends of two thermoplastic pipelines 1, 2, see FIG. 1, use is made of a thermoplastic electric welded sleeve 3, which comprises a sleeve member 4 and a heating element 5, that is, a resistance wire formed from spaced windings 6 embedded in the sleeve member 4 and two terminals 7, 8. Heating element 5 is arranged in the vicinity of the inner wall 9 of sleeve member 4 and in its extension forms the welding area 10 between the ends of pipelines 1, 2 and the inner wall of sleeve member 4. Heating element 5 is connected by means of terminals 7, 8 to a not shown power supply, which generally controls the supply of thermal energy in such a way that the heat formed in the welding area 10 ensures a completely satisfactory weld between sleeve member 4 and the ends of pipelines 1, 2. In order that the welding pressure necessary for good welding is obtained, a shrinkage reserve is imparted to the sleeve member 4, as a result of which it contracts on plasticizing the welding area 10 and is shrunk onto the ends of pipelines 1, 2.

In FIG. 1 connecting member 3 is an electric welded sleeve. However, it could also be replaced by a differently constructed welded sleeve enabling the necessary heat quantity to be introduced into the welding area 10, such as by induction heat or a chemical reaction.

In FIG. 2 the connecting member 3' is a spot drilling or connecting clip embracing the pipeline 2, having a saddle part 38 and an opposite saddle part 40 connected to saddle part 38 by bolts 39. Saddle part 38 has a connector part 41 with a pipe 43 terminating in a pipe connection 42. Connector part 41 is closed by a cap 44, which can be moved for the purpose of spot drilling the pipeline 2 after welding the saddle part 38 to the latter. Heating element 5 is a resistance heating wire forming the welding area 10 with windings passing round the opening 45 of pipe 43 and is connected by means of terminals 7, 8 to the power supply.

However, connecting member 3 can be provided by any random construction, but in all cases heat and pressure for welding purposes must be produced by suitable means in the welding area 10 and monitoring thereof is necessary.

For drawing reasons, FIGS. 1 and 2 do not show an indicator, which is shown in the larger-scale details of FIGS. 3 to 13.

The detail shown in FIGS. 3 and 4 comprises part of the pipeline 2 and part of the sleeve member 4 of an electric welded sleeve or saddle part 38 of the spot drilling or connecting clip with a partly represented heating element 5 formed from a resistance heating wire and an indicator 12 arranged on welding area 10. Indicator 12 comprises a cylindrical cavity 14, whose bottom 15 engages on the welding area 10. An indicator 12 is displaceably mounted in cavity 14 and comprises a piston or plunger 17 and an indicator pin 18. Prior to the welding process, which is initiated by heat generation in heating element 5, the piston 17 is located in its initial position on the bottom 15 of cavity 14, while the indicator pin 18 projects into a passage 19 of a cover 20 covering cavity 14, but does not project above the outer circumference of sleeve member 4.

If the welding process is now initiated by the generation of heat in heating element 5, the welding area 10 softens, as indicated in FIG. 4, the bottom 15 of cavity 14 plasticizing to such an extent when the temperature is sufficient, that the welding pressure in welding area 10 is high enough in order to force plastic material into the cavity 14 and move indicator pin 18 into the position shown in FIG. 4. In this case cover 20 forms a stop, beyond which the piston 17 cannot be moved. Indicator pin 18 projecting from passage 19 forms a readily visible and tangible indication. The end position of indicator pin 18 is limited by cover 20, so that for reaching the same only that quantity of plastic material 21 is required which corresponds to the volume of cavity 14. Thus, the indicator pin 18 has a precisely defined travel distance a. This arrangement leads to a clearly defined good/bad indication. If indicator pin 18 has moved out by travel distance a, this means that the welding conditions, that is, the welding temperature and pressure were correct. The adaptation of the movement of piston 17 as a function of the welding pressure takes place through the choice of the material thickness b in bottom 15 of cavity 14. Indicator pin 18 can be made optically more conspicuous by the use of a color contrasting with the sleeve member 4 or saddle part 38.

In order to ensure that the piston 17 does not slide into the end position prior to welding, it is possible to provide friction-increasing means between piston 17 and the inner wall of cavity 14. In the case of FIG. 5, they are constituted by disks 22 shaped onto the outer circumference of piston 17. The friction grip can also be achieved by corresponding fitting between indicator pin 18 and passage 19 or by disks on the wall of passage 19.

In the embodiment of the indicator 12 in FIG. 6, a compression spring 23 prevents the undesired displacement of indicator pin 18.

In FIGS. 7 to 11 are shown different embodiments of indicator 12, in which the cover 20 is constructed in different ways. In FIG. 7 a slot 25 is made in sleeve member 4 or saddle part 38 and in said slot engages a stop ring 27 provided with a projection 26. If the thickness of sleeve member 4 or saddle part 38 is not adequate, it is possible to provide a reinforcing collar 28 on its outer circumference and this can naturally also be used with other cover constructions.

In FIG. 8 cover 20 is provided with an external thread 29, which is screwed into an internal thread 30 arranged in the sleeve member 4 or saddle part 38 as an extension of cavity 14.

In the case of FIG. 9, cover 20 is fixed to the free edge of cavity 14 by an adhesive joint 31, whereas in FIG. 10 cover 20 is fixed to the free edge of cavity 14 by a press connection.

In FIG. 11 cover 20 forms an integral part of sleeve member 4 or the saddle part and is obtained by thermal deformation on the free edge of cavity 14. The heat can be applied to the area to be deformed by a heating element, by ultrasonics or by a high frequency field. As a function of the material of sleeve member 4 or saddle part 38, it is also possible to use cold deformation.

In the indicator embodiment according to FIG. 12, passage 19 is covered by a foil 32. As a result piston 17 cannot perform an undesired movement into the end position and can instead only be moved after foil 32 has been penetrated by indicator pin 18 in its end position. Foil 32 can be made from the same material as sleeve member 4 or saddle part 38 or it can be formed as part of the cover 20, as is represented in FIGS. 7 to 10 as a part produced separately from sleeve member 4.

In the embodiment according to FIG. 13, indicator pin 18 is constructed in a special way. It can be provided with a marking in the form of one or more lines 35 or by a color gradation 36. The indicator pin 38 could also be provided with a color-changing finish. Finally, the indicator pin 18 could be used as a primary element for a remote indication or for switching a device, that is, the power supply for welding purposes.

The aforementioned indicator 12 has been described in conjunction with an electric welded sleeve. However, as stated, it can be used for all thermoplastic objects weldable by incorporated heating elements.

The arrangement of the cavity 14 need not have an axis at right angles to welding area 10. The indicator could also have its axis parallel or sloping with respect to the welding area 10, that is, it could be on the faces of an electric welded sleeve. Cavity 14 can have a cross section other than a circular cross section. Here again, the indicator has a clearly defined travel distance of piston 17, which is displaceably arranged in cavity 14 separately from sleeve member 4 or saddle part 38.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A weldable connecting member for connecting thermoplastic pipe elements comprising a thermoplastic body having a heating element embedded therein defining a welding area for generating heat for welding the body to the pipe elements, said body being provided with a cavity having a cover in the welding area, an indicator having a piston and an indicator pin secured thereto positioned in said cavity and movable during welding by plasticized material forced into said cavity under said piston, from an initial position near the welding area into an end position remote from the welding area, said indicator being provided with means when in the end position to indicate a measure of the temperature and pressure conditions in the welding area.

2. A connecting member according to claim 1 wherein the indicator pin projects out of a passage provided in said cover.

3. A connecting member according to claim 2 wherein the piston is provided with spring means for biasing the piston toward the initial position.

4. A connecting member according to claim 2 wherein the piston is provided with friction-producing disks on its circumferential surface.

5. A connecting member according to claim 2 wherein there is a friction grip between the indicator pin and the passage.

6. A connecting member according to claim 2 wherein the cover closing the cavity is constructed as a member separate from the body and is connected with the latter.

7. A connecting member according to claim 6 wherein the cover is connected by a welded joint.

8. A connecting member according to claim 6 wherein the cover is connected by a screw connection to the body.

9. A connecting member according to claim 2 wherein the cover is constructed as a seal shaped from the material of the body.

10. A connecting member according to claim 2 wherein the indicator pin is covered in the initial position of the piston by a foil terminating the passage of the cover which is penetrated by the indicator pin when pressure occurs in the welding area thereby moving the piston to the remote position.

11. A connecting member according to claim 1 wherein the indicator means has a color differing from that of the body.

12. A connecting member according to claim 6 wherein said cover is detachably connected.

13. A connecting member according to claim 6 wherein said cover is non-detachably connected.

14. A connecting member according to claim 6 wherein the cover is connected by an adhesive joint.

15. A connecting member according to claim 6 wherein the cover is connected by a press-injoint.

* * * * *